United States Patent
Mendez et al.

(10) Patent No.: US 8,672,349 B2
(45) Date of Patent: Mar. 18, 2014

(54) AIRBAG

(75) Inventors: Gerardo Mendez, West Bloomfield, MI (US); Vivekanandhan Maripudi, Bloomfield Hills, MI (US); Bijal Pramurh Patel, Berkley, MI (US)

(73) Assignees: TK Holdings Inc., Auburn Hills, MI (US); Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/546,521

(22) Filed: Jul. 11, 2012

(65) Prior Publication Data
US 2013/0069352 A1    Mar. 21, 2013

Related U.S. Application Data

(60) Provisional application No. 61/506,885, filed on Jul. 12, 2011.

(51) Int. Cl.
*B60R 21/26* (2011.01)

(52) U.S. Cl.
USPC ........................................ 280/736; 280/743.2

(58) Field of Classification Search
USPC ............... 280/736, 743.1, 743.2, 739, 742
See application file for complete search history.

(56) References Cited

U.S. PATENT DOCUMENTS

| | | | |
|---|---|---|---|
| 7,264,268 B2 | 9/2007 | Ehrke | |
| 7,445,237 B2 | 11/2008 | Boyle et al. | |
| 7,686,333 B2 | 3/2010 | Choi | |
| 7,883,110 B2 | 2/2011 | Pausch | |
| 8,172,260 B2 * | 5/2012 | Fischer et al. | 280/729 |
| 2007/0108750 A1 | 5/2007 | Bauer et al. | |
| 2008/0179866 A1 | 7/2008 | Maertens | |
| 2008/0203713 A1 | 8/2008 | McFadden et al. | |
| 2008/0290638 A1 * | 11/2008 | Sahm et al. | 280/743.1 |
| 2011/0079988 A1 | 4/2011 | Bauer et al. | |
| 2012/0001408 A1 | 1/2012 | Mendez et al. | |
| 2013/0015641 A1 * | 1/2013 | Mendez | 280/728.2 |

OTHER PUBLICATIONS

International Search Report PCT/US2012/046190 dated Dec. 18, 2012.

* cited by examiner

*Primary Examiner* — Faye M. Fleming
(74) *Attorney, Agent, or Firm* — Foley & Lardner LLP

(57) ABSTRACT

An airbag module including an inflatable airbag and an inflator configured to provide gas for inflating the airbag. The airbag includes a vent opening in a surface of the airbag to allow inflation gas to escape the airbag. A tether is aligned against the surface of the airbag adjacent the opening. The tether includes a first tether opening and wherein the tether is configured so that the first tether opening and the vent opening are aligned prior to the full deployment of the airbag. During deployment of the airbag the position of the tether changes so that the first tether opening and vent opening are no longer aligned.

18 Claims, 4 Drawing Sheets

AIRBAG

CROSS REFERENCE TO RELATED APPLICATIONS

This application claims priority to and the benefit of U.S. Provisional Patent Application No. 61/506,885 filed Jul. 12, 2011. The foregoing provisional patent application is incorporated by reference herein in its entirety.

BACKGROUND

The present application relates generally to the field of airbag systems. More specifically, the application relates to an airbag system including variable passive venting.

SUMMARY

According to an exemplary embodiment disclosed herein an airbag module includes an inflatable airbag and an inflator configured to provide gas for inflating the airbag. The airbag includes a vent opening in a surface of the airbag to allow inflation gas to escape the airbag. A tether is aligned against the surface of the airbag adjacent the opening. The tether a first tether opening and is configured so that the first tether opening and the vent opening are aligned prior to the full deployment of the airbag. During deployment of the airbag the position of the tether changes so that the first tether opening and vent opening are no longer aligned.

The tether may include a second tether opening that is aligned with the vent opening when the airbag is fully deployed. The second tether opening may be a different size than the first tether opening. The module may further include a tether guide layer positioned on the opposite side of the tether from the airbag opening to maintain the position of the tether against the surface of the airbag. The guide layer may include a third opening aligned with the vent opening. The size of the third opening is substantially the same as the size of the vent opening.

The tether includes first and second ends and, prior to deployment of the airbag, both the first and second ends may be connected to the airbag. During deployment of the airbag the first end may be configured to separate from the airbag. The tether may include a frangible portion that severs when the airbag deploys so that after the frangible portion severs, a portion of the tether containing the first tether opening has a free end not connected to the airbag. The tether may include a second opening that is aligned with the vent opening when the airbag is fully deployed. The second opening may be a different size than the first opening. The airbag may include a side panel extending substantially in a plane parallel to a direction of deployment of the airbag, and wherein the tether is connected to the side panel. The tether may be oriented in a direction transverse or parallel to the direction of deployment of the airbag.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DESCRIPTION

The same or like reference numbers have been used throughout the drawings to refer to the same or like parts. Although the specification refers primarily to a front passenger-side airbag assembly, it should be understood that the subject matter herein is applicable to an airbag assembly in general.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

Figure 1:
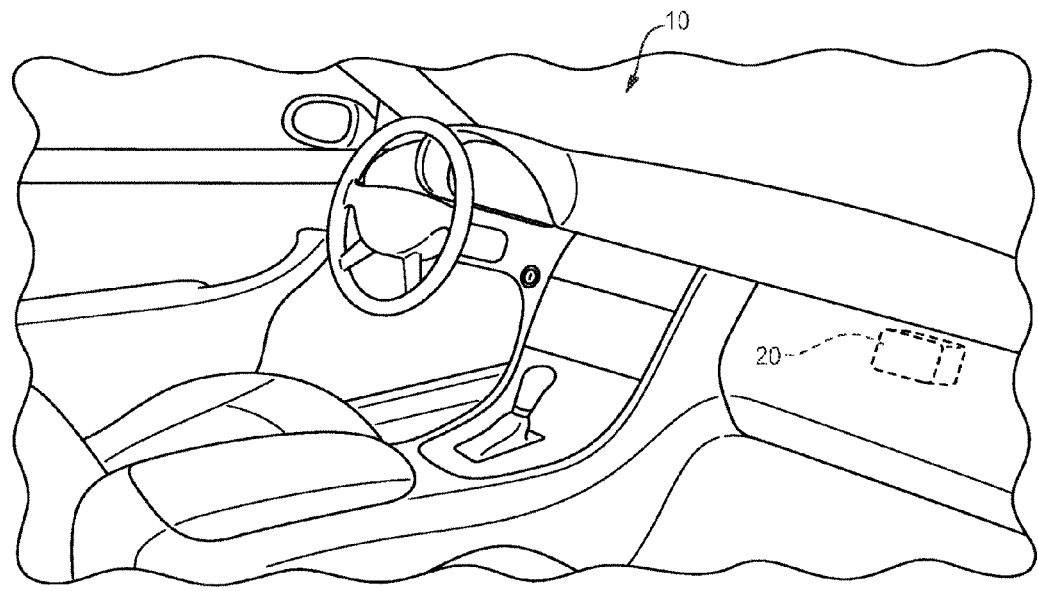
FIG. 1 is a perspective view of a passenger compartment of an exemplary motor vehicle.

FIG. 1-5 illustrate an airbag assembly 20, for example a passenger-side airbag assembly 20, for use within a motor vehicle 10. As shown in FIG. 1, the vehicle 10 may be a typical sedan. Other types of passenger vehicles (e.g. truck, van, cross-over vehicle, etc.), as well as other moving vehicles that offer occupant protection to seated passengers in the form of frontal airbags (such as passenger-side airbags included in passenger-side airbag assemblies) may also be used. The passenger-side airbag assembly 20 may be used within the vehicle 10 to provide an occupant 12 with frontal protection during a vehicle dynamic event that triggers deployment of the airbag assembly 20.

Figure 2:
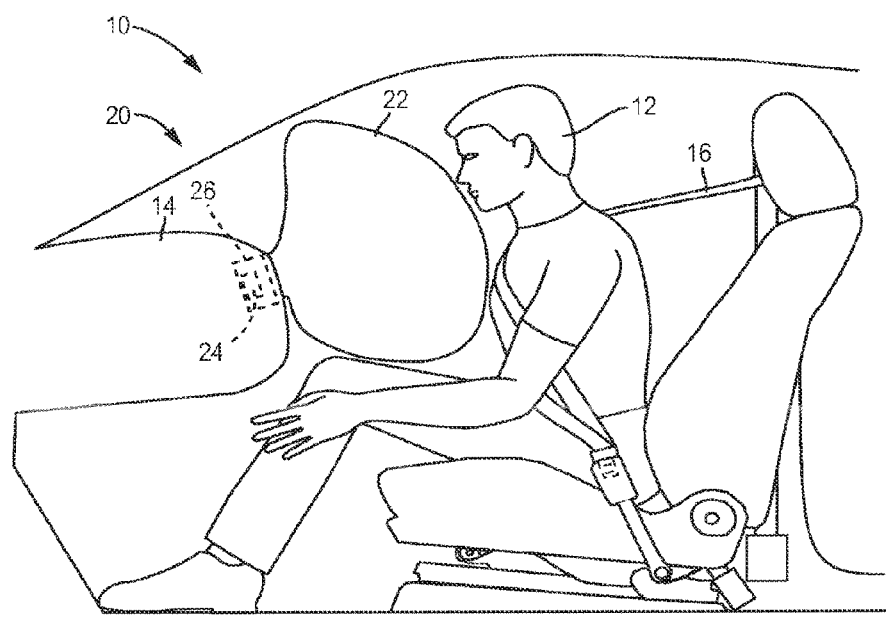
FIG. 2 is a cross-car partial section view of a passenger-side airbag shown in a deployed or unfolded position supporting an occupant.

Referring to FIG. 2, the airbag assembly or module 20 may include an airbag 22 or airbag cushion 22, an inflator 24 configured to provide gas to the airbag 22, and a housing 26 configured to retain the inflator 24 and the airbag 22 in position.

Typically, deployment of the airbag 22 included in the passenger-side airbag assembly 20 is triggered by a dynamic impact of the vehicle 10, whereby impact sensors communicate to a vehicle module or other device which communicates to the inflator 24 of the airbag assembly 20. The inflator 24 generates inflation gas, which is then forced into the airbag cushion 22 of the passenger-side airbag assembly 20. As the amount of inflation gas forced into the airbag cushion 22 of the passenger-side airbag assembly 20 increases, the internal chamber pressure of the airbag cushion 22 increases, allowing the airbag cushion 22 to breach the dashboard 14 (or other stored position), whereby the airbag cushion 22 deploys substantially outward (i.e., substantially perpendicular to the longitudinal or fore-aft axis of the vehicle) and rearward toward the occupant 12. The airbag cushion 22 is formed of a suitable fabric, such as nylon.

The airbag 22 of the passenger-side airbag assembly 20 improves occupant safety by providing protection to the occupant 12 by limiting further passenger-side displacement of and by decelerating the occupant 12. The airbag cushion 22 of the airbag assembly 20 also absorbs energy, such as kinetic energy, and the forces exerted by the occupant 12 when the vehicle accelerates or decelerates. The airbag cushion 22 absorbs energy from the occupant 12 that would otherwise be transferred to the occupant 12 through an impact to the dashboard 14 or other relatively rigid bodies within in the vehicle 10 interior.

Figure 3:
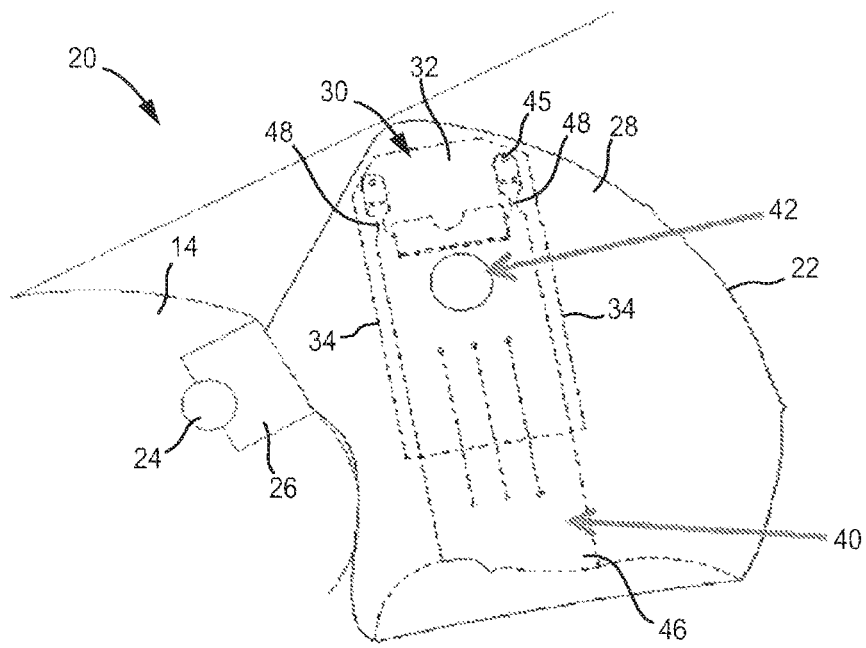
FIG. 3 is a side view of the passenger-side airbag of FIG. 2 in a partially inflated state, according to an exemplary embodiment.
Figure 4:
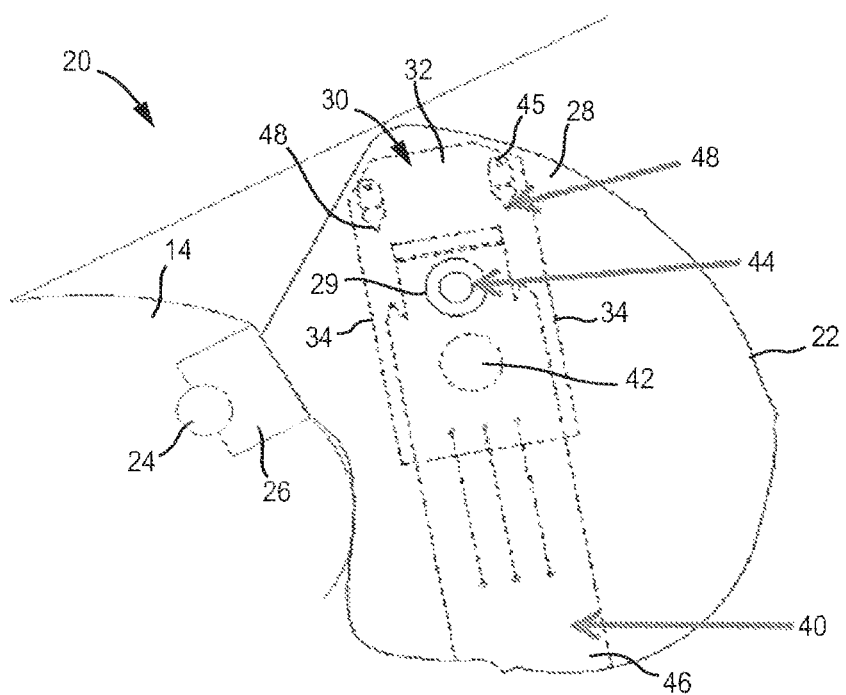
FIG. 4 is a side view of the passenger-side airbag of FIG. 2 in a fully inflated state, according to an exemplary embodiment.
Figure 5:
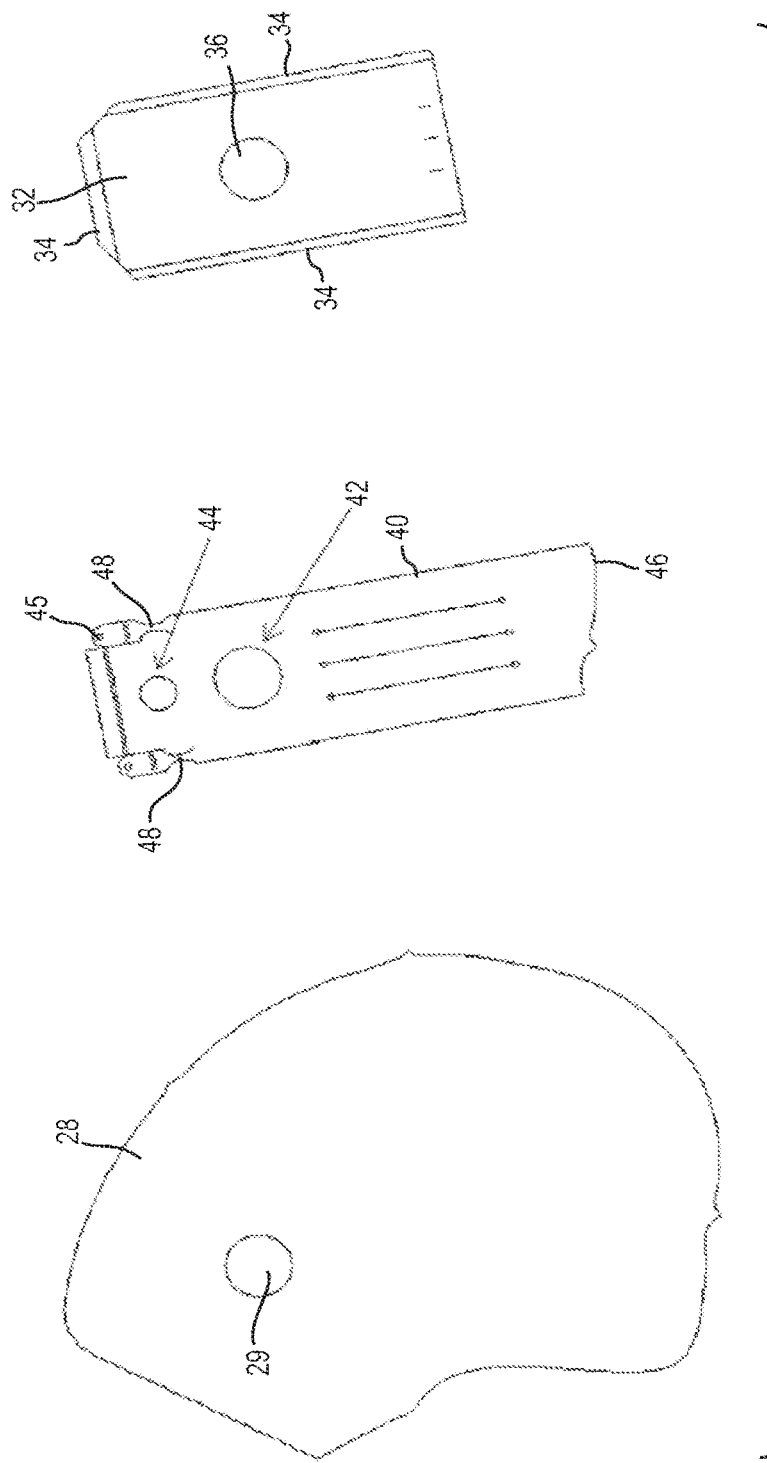
FIG. 5 is a plan view of several components of the passenger-side airbag of FIG. 2, according to an exemplary embodiment.

As shown in FIGS. 3-4, the airbag cushion includes one or more vents 30 through which inflation gas is allowed to escape. The escape of the inflation gas allows the airbag cushion to deflate, facilitating the dissipation of the kinetic energy of the occupant 12 impacting the airbag cushion 22. Airbags, such as airbag assembly 20, are configured to be most effective when the occupant 12 is restrained in the vehicle by a safety device such as a safety belt 16 (e.g., an "in-position" situation). In an in-position situation, the airbag cushion 22 is allowed to fully inflate before the occupant 12 impacts the cushion 22. The airbag cushion includes a boundary layer that retains the inflation gas. The boundary layer may be formed by one or more material panels. The panels may be formed by fabric. For example, in one disclosed embodiment the boundary layer may be formed by a pair of side panels and a main panel located therebetween.

However, in some scenarios, an occupant 12 may not be restrained and may be closer to the vehicle dash 14 or other structure during the vehicle crash (e.g., an "out-of-position" situation). In other scenarios, the vehicle 10 may be occupied by a child in a child safety seat. In either situation, the occupant 12 may impact the airbag cushion 22 as the cushion 22 is still inflating. In out of positions situations, it is desirable to limit the force of the airbag cushion deployment. Thus, in these situations it may be desirable to deploy the airbag cushion with a vent or vent openings open to allow inflation gas to escape the airbag and reduce the deployment force of the airbag.

According to an exemplary embodiment, the vent opening 30 includes a tether guide 32 and a tether 40 with at least two openings 42 and 44. The vent 30 for airbag cushion 22 is configured to be a variable vent that allows a conventional rate of deflation if an occupant 12 impacts the airbag cushion 22 in an "in-position" situation and allows inflation gas to more easily escape the interior of the airbag cushion 22 to allow an increased rate of deflation if an occupant 12 impacts the airbag cushion 22 in an "out-of-position" situation.

The tether guide 32 is coupled along at least two sides 34 to a side panel 28 (see FIG. 5) of the airbag cushion 22 to provide a passage (e.g., sleeve, slot, etc.) for the tether 40. The tether guide 32 includes an opening 36. The tether guide 32 is coupled to the side panel 28 such that the opening 36 is aligned with an opening 29 in the side panel 28. According to an exemplary embodiment, tether guide 32 may be formed from a fabric similar to the fabric of the airbag cushion 22.

The tether 40 is formed from a strip or panel of fabric and has a first end 45 and a second end 46. The first end 45 and the second end 46 are each coupled to the side panel 28 of the airbag cushion 22. According to an exemplary embodiment, the first end 45 is coupled to side panel 28 by one or more frangible portions 48 (e.g., tear tabs, breakaways, etc.).

At least a portion of the tether 40 is provided between the tether guide 32 and the side panel 28 to restrain or control the position and movement of the tether 40. According to an exemplary embodiment, the first end 45 is coupled to the side panel 28 under the tether guide 32 while the second end 46 extends beyond the tether guide 32. In other exemplary embodiments, the first end 45 may extend beyond the tether guide 32 on a side opposite of the second end 46.

The tether 40 includes at least two openings 42 and 44. At various points in the inflation and deflation process for the airbag system 20, the openings 42 and 44 are aligned with the opening 36 in the tether guide 32 and the opening 29 in the side panel 28 to provide an outlet passage for inflation gasses to escape the interior chamber of the airbag cushion 22. The openings 42 and 44 are differently sized and/or shaped to provide varied areas for the outlet passage and therefore control the internal pressure, deflation rate and deployment force of the airbag cushion 22. According to an exemplary embodiment, the first opening 42 has a diameter that is approximately equal to the diameters of the of the opening in the side panel 29 and the opening in the vent guide 36 and the second opening 44 has a diameter that is less than the diameters of the opening in the side panel 29 and the opening in the vent guide 36. According to a particular exemplary embodiment, the first opening 42 has a diameter of approximately 65 mm. and the second opening 44 has a diameter of approximately 45 mm. In a preferred embodiment, the cross sectional area of the second opening 44 is about 60-75 percent of the cross-sectional area of the first opening 42.

As shown in FIG. 3, with the cushion 22 in a partially inflated state, the tether 40 is not yet fully extended and the vent 30 is in a first configuration. In the partially inflated state shown in FIG. 3, the first opening 42 is aligned with the opening 36 in the tether guide 32 and the opening 29 in the side panel 28. If the inflation of the cushion 22 is impeded (e.g., by the airbag cushion 22 striking an out-of-position occupant or a child seat, etc.), the relatively large outlet passage of the vent 30 allows the inflation gas to more easily escape the airbag cushion 22. This reduces the internal pressure of the cushion 22 and reduces the force applied to an occupant striking the cushion 22 as it is inflating.

As shown in FIG. 4, as the cushion 22 continues to inflate, the second end 46 is pulled away from the first end 45, until the first end 45 is decoupled from the side panel 28 by the tearing of the frangible portions 48. With the first end 45 no longer coupled to the side panel 28, the tether 40 can be pulled between the tether guide 32 and the side panel 28. When the airbag cushion 22 is fully inflated, the smaller second opening 44 is aligned with the opening 36 in the tether guide 32 and the opening 29 in the side panel 28. In this configuration, the second opening 44 decreases the size of the outlet passage of the vent 30 such that the cushion 22 has a relatively high internal pressure. The internal pressure of the cushion 22 with the vent 30 in the second configuration is high enough to reduce the likelihood that an in-position occupant 12 will be able collapsing the cushion 22 prematurely and impacting a rigid structure such as the dashboard 14.

The variable nature of the vent 30 provides several advantages. The internal pressure of the cushion 22 at various points during deployment may be varied by changing the diameters of the openings 29, 36, 42, and 44 or by providing more openings of various sizes and locations in the tether 40. The vent 30 is a passive mechanism that does not require additional active components such as squibs. By decreasing the size of the outlet passage of the vent 30 later in the deployment process, the output of the inflator 24 may be reduced without increasing the likelihood of the occupant collapsing the airbag cushion 22 prematurely and impacting the dashboard 14.

While only one variable vent 30 is described, the airbag cushion 22 may include more than one variable vent 30. For instance, a vent 30 as described above may be provide for each of the side panels of the airbag cushion 22.

In another exemplary embodiments, a variable vent similar to the vent 30 described may be used that initially provides a small outlet passage and later provides a larger outlet passage. The vent may be utilized to control the flow of gasses between the interior of the cushion 22 and the exterior or between sub-chambers in the cushion 22.

Figure 6:
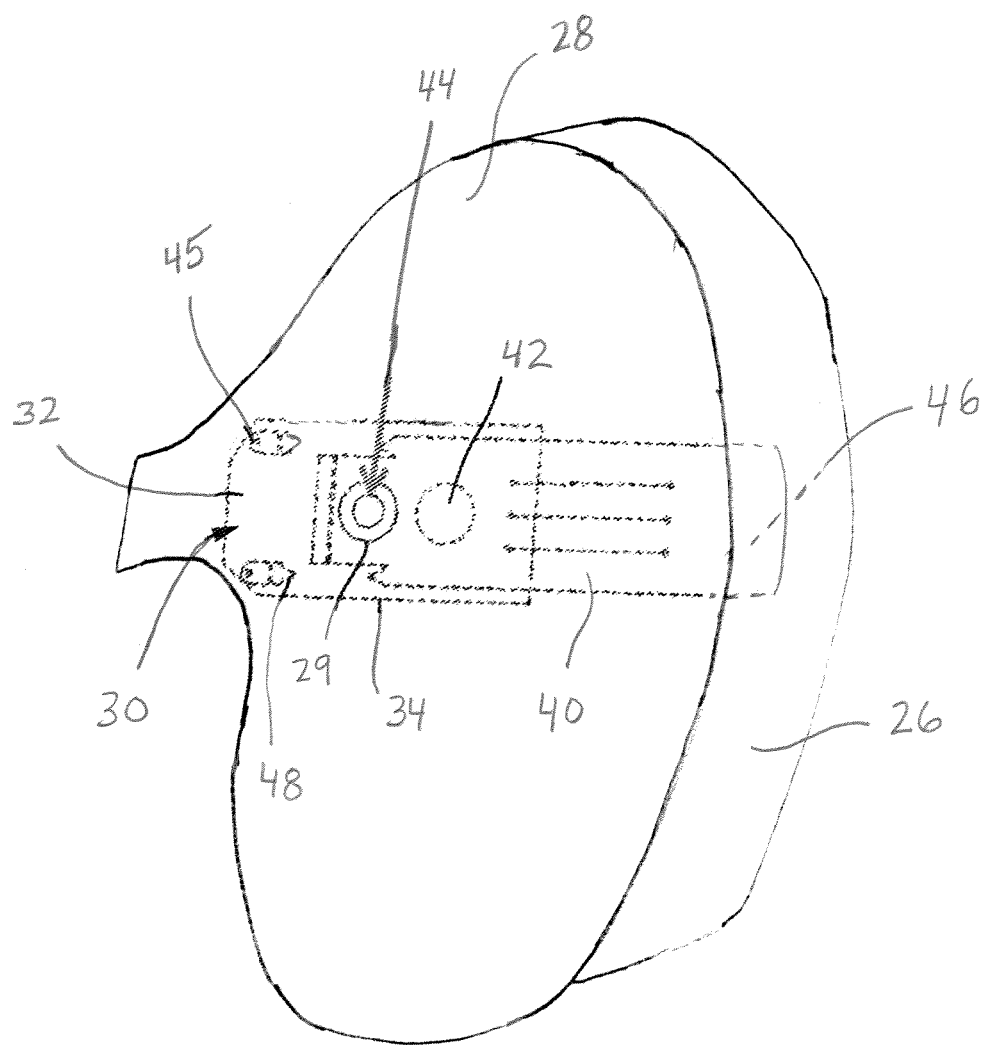
FIG. 6 is a side and front perspective view of an exemplary embodiment of a passenger-side airbag.

As shown in FIG. 6, the tether 40 and tether guide 32 may be oriented in the direction of deployment of the airbag. The first end 45 of the tether may be connected to the side panel 28 or at a location adjacent the airbag inflator and vehicle mounting location for the airbag module. The tether guide 32 may be coupled along at least two sides 34 to the side panel 28. The second end 46 of the tether may be coupled near the edge of the side panel 28 toward the occupant or directly to the main panel 26. In such a configuration as shown in FIG. 6, the location of the occupant (e.g., an out of position occupant) may limit deployment of the airbag and tether and thereby control the position of the tether and the alignment of the openings, and thereby the venting of the airbag.

It is important to note that the construction and arrangement of the airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag module comprising:
an inflatable airbag;
an inflator configured to provide gas for inflating the airbag;
wherein the airbag includes a vent opening in a surface of the airbag to allow inflation gas to escape the airbag;
a tether aligned against the surface of the airbag adjacent the opening; wherein the tether includes a first tether opening and wherein the tether is configured so that the first tether opening and the vent opening are aligned prior to the full deployment of the airbag, and
a guide layer that is separate from the tether and is fixedly coupled to the airbag, wherein the guide layer is positioned on the opposite side of the tether from the vent opening to thereby maintain the tether against the surface of the airbag;
wherein during deployment of the airbag the position of the tether changes so that the first tether opening and vent opening are no longer aligned; and
wherein the tether includes a second tether opening that is aligned with the vent opening when the airbag is fully deployed.

2. The airbag module of claim 1, wherein the second tether opening is smaller than the first tether opening.

3. The airbag module of claim 1, wherein the guide layer includes a third opening aligned with the vent opening.

4. The airbag module of claim 3, wherein the size of the third opening is substantially the same as the size of the vent opening.

5. The airbag module of claim 1, wherein the airbag includes a side panel extending substantially in a plane parallel to a direction of deployment of the airbag, and wherein the tether is connected to the side panel.

6. An airbag module comprising:
an inflatable airbag;
an inflator configured to provide gas for inflating the airbag;
wherein the airbag includes a vent opening in a surface of the airbag to allow inflation gas to escape the airbag;
a tether aligned against the surface of the airbag adjacent the opening;
wherein the tether includes a first tether opening and wherein the tether is configured so that the first tether opening and the vent opening are aligned prior to the full deployment of the airbag, and
wherein during deployment of the airbag the position of the tether changes so that the first tether opening and vent opening are no longer aligned;
wherein the tether includes first and second ends and, prior to deployment of the airbag, both the first and second ends are connected directly to the airbag; and
wherein during deployment of the airbag the first end separates from the airbag.

7. The airbag module of claim 6, wherein the tether includes a frangible portion that severs when the airbag deploys so that after the frangible portion severs, a portion of the tether containing the first tether opening has a free end not connected to the airbag.

8. The airbag module of claim 7, wherein the tether includes a second opening that is aligned with the vent opening when the airbag is fully deployed.

9. The airbag module of claim 8, wherein the second opening is a different size than the first opening.

10. An inflatable airbag for protecting a vehicle occupant comprising: a boundary layer for retaining inflation gas within an inflatable chamber;
a vent opening in the boundary layer for allowing inflation gas to escape outside of inflatable chamber;
a tether connected to the boundary layer and positioned against the boundary layer;
wherein the tether includes a first opening aligned with the vent opening when the airbag begins to inflate and a second opening aligned with the vent opening when the airbag is fully inflated;
wherein the tether includes an end portion coupled directly to the boundary layer, and during deployment of the airbag the end portion of the tether separates from the boundary layer to allow the tether to change position so that the second opening aligns with the vent openings.

11. The airbag of claim 10, wherein the boundary layer includes a side panel extending substantially in a plane parallel to a direction of deployment of the airbag, and wherein the tether is connected to the side panel.

12. The airbag of claim 11, wherein the tether extends in a direction transverse to the direction of deployment of the airbag.

13. The airbag of claim 10, wherein the boundary layer includes a side panel and a main panel configured to face the occupant when the airbag is inflated, wherein the vent opening is located in the side panel and wherein one end of the tether is connected to the main panel.

14. The airbag of claim 13, wherein the tether extends in a direction parallel to a direction of deployment of the airbag.

15. The airbag of claim 10, further comprising a guide layer, wherein the guide layer is positioned on the opposite side of the tether from the airbag opening to thereby maintain the position of the tether against the surface of the airbag.

16. The airbag of claim 15, wherein the guide layer includes a third opening aligned with the vent opening.

17. The airbag of claim 16, wherein the size of the third opening is substantially the same as the size of the vent opening.

18. The airbag of claim 10, wherein the first and second openings are different sizes.

\* \* \* \* \*